(12) United States Patent
De Rigaud

(10) Patent No.: US 6,287,471 B1
(45) Date of Patent: Sep. 11, 2001

(54) TREATMENT OF AQUEOUS EFFLUENTS BY INJECTION OF CARBON DIOXIDE

(75) Inventor: Jean-Mathieu De Rigaud, Paris (FR)

(73) Assignee: L'Air Liquide, Societe Anonyme pour l'Etude et l'Exploitation des Procedes Georges Claude, Paris (FR)

(*) Notice: Subject to any disclaimer, the term of this patent is extended or adjusted under 35 U.S.C. 154(b) by 0 days.

(21) Appl. No.: 09/391,003

(22) Filed: Sep. 7, 1999

Related U.S. Application Data

(63) Continuation-in-part of application No. 09/263,501, filed on Mar. 8, 1999.

(30) Foreign Application Priority Data

Mar. 9, 1998 (FR) .................................................. 98 02829

(51) Int. Cl.$^7$ ...................................................... C02F 1/52
(52) U.S. Cl. .......................... 210/724; 210/726; 210/752; 210/928
(58) Field of Search .................................. 210/723, 724, 210/726, 752, 767, 928

(56) References Cited

U.S. PATENT DOCUMENTS 4,137,158 * 1/1979 Ishida et al. .
4,188,291 * 2/1980 Anderson .
4,350,597 * 9/1982 Selm et al. .

FOREIGN PATENT DOCUMENTS 0 928 789 A1    7/1999   (EP) .
58098185    *   6/1983   (JP) .

* cited by examiner

Primary Examiner—David A. Simmons
Assistant Examiner—Betsey Morrison Hoey
(74) Attorney, Agent, or Firm—Burns, Doane, Swecker & Mathis, L.L.P.

(57) ABSTRACT

The present invention relates to a process for treating more or less concentrated aqueous effluents, such as processing waters, industrial or urban waste waters, and sludges, in particular sludges derived from these waste waters. The said process comprises at least one step of physical separation of a liquid phase and of a solid phase dispersed in the said liquid phase and at least one addition of chemical conditioning reagents and optionally of antifoaming agents. The process also comprises the injection of carbon dioxide ($CO_2$) into the said aqueous effluents, in an amount which is sufficient to give them a pH of less than 7.8.

24 Claims, 2 Drawing Sheets

TREATMENT OF AQUEOUS EFFLUENTS BY INJECTION OF CARBON DIOXIDE

CROSS-REFERENCE TO RELATED APPLICATIONS

Figure 1:
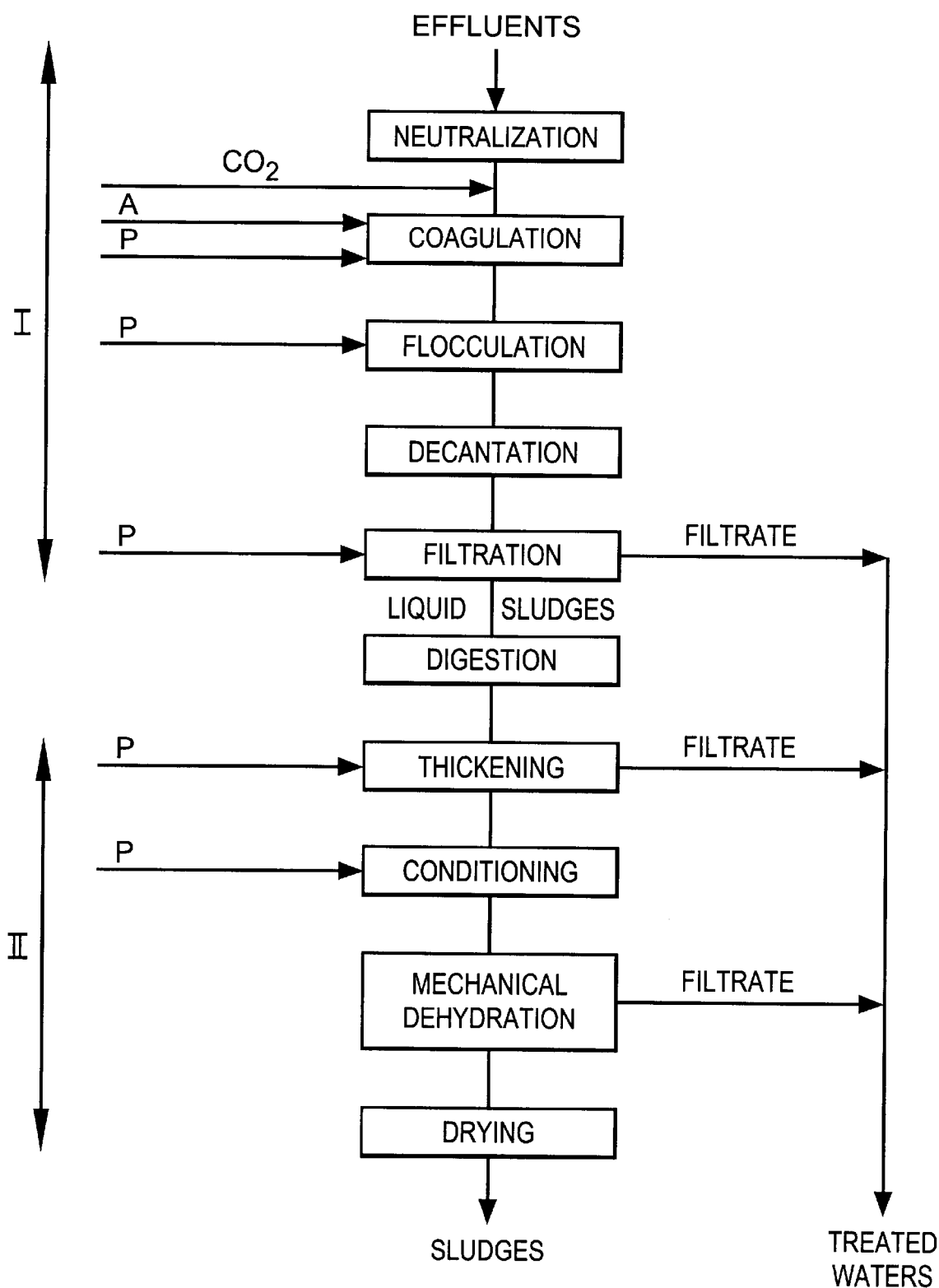

This application is a continuation-in-part of application Ser. No. 09/263,501, filed Mar. 8, 1999, which application is incorporated by reference in its entirety herein.

BACKGROUND OF THE INVENTION

1. Field of the Invention

The present invention relates to the treatment of aqueous effluents. The invention relates more specifically to an improvement to processes, according to the prior art, for treating such aqueous effluents. The said improvement facilitates the removal of materials in suspension and/or colloidal materials present in the treated effluents. These effluents, which are more or less concentrated suspensions, can consist in particular of processing waters, for example from the paper industry, industrial or urban waste waters, or even river waters or alternatively sludges, derived in particular from such waste waters.

2. Description of the Related Art

Processes for treating such effluents are directed towards producing, depending on the context, more concentrated effluents, liquid sludges or thickened sludges. They can also be directed towards depositing charges on a substrate; more generally, towards ridding the industrial effluents concerned of at least some of their charges. The said processes generally comprise several steps and involve large amounts of treatment reagents: chemical conditioning reagents and antifoaming agents, if necessary. These chemical conditioning reagents of the inorganic salt or synthetic organic polymer type, which are known to those skilled in the art, are used as coagulants and/or flocculents. They facilitate the aggregation of the solid particles in suspension—small-sized particles, colloidal particles—and, consequently, the subsequent separation of the solid and liquid phases by treatments which exert essentially physical actions (decantation, centrifugation, filiation, etc.). In paper manufacture, in the processing waters, they improve the aggregation and binding of the charges (such as talc, kaolin, etc.) or of the pigments (organic or inorganic) to the cellulosic substrate.

The cost of chemical reagents of this type can represent more than 50% of the running expenses of an aqueous effluent treatment plant, such as an urban waste water purification plant.

The improvement, proposed according to the present invention is advantageous, in particular, in that its use allows a substantial reduction in the amounts of treating reagents required and thus a saving of the same magnitude in the running expenses of the process.

Processes for treating aqueous effluents in which an inorganic acid is added to the said effluents in order to generate carbon dioxide therein have been described in patent applications JP-A-51,124,042 and JP-A-59,010,388. The said inorganic acid consumes, by chemical reaction, carbonates present in the effluent or added thereto, so as to generate the said carbon dioxide in situ. Document JP-A-59,010,388 describes the treatment of very basic effluents. In these effluents, the acid is added in an amount such that their pH is brought to a value of between 4 and 5.

The carbon dioxide, thus generated in situ by the action of a strong acid on an alkaline material, exerts, with reference to the physical phenomenon of flotation, a purely mechanical, beneficial action. This beneficial action is based on the action of the gas bubbles which rise to the surface: this is referred to as a flotation action. It cannot be based on an actual chemical action of the said gas, which, under the conditions specified, can only dissolve in the effluent in very small amounts.

It is moreover imagined that the beneficial action of the said gas is countered by the drawbacks present, on the one hand, in using a strong acid in the process, and, on the other hand, in introducing anions such as sulphate or chloride into the treated effluent, via the addition of the said acid.

SUMMARY OF THE INVENTION

The improvement according to the invention is not based on the action, in the treated effluents, of an inorganic acid, or on the mechanical action of a gas. It is based on the chemical action of carbon dioxide, in other words on a doping of the treated effluent with bicarbonates and carbonates. A person skilled in the art will readily understand this on reading the text herein below.

Thus proposed is a novel process for treating more or less concentrated aqueous effluents, such as processing waters, industrial or urban waste waters, and sludges, in particular sludges derived from these waste waters. Conventionally, the said process comprises at least one step of physical separation of a liquid phase and of a solid phase dispersed in the said liquid phase (by processes such as decantation, flotation, filtration, etc.). A step of this type is carried out on the effluent to be treated which contains such a solid phase dispersed in a liquid phase and in the situation in which the process includes several steps of this type, the said steps of this type, which are different from the first step, are carried out on some of the effluent which has undergone the previous steps. In order to optimize the implementation and the yield for this separation step, the addition (at least one addition) to the treated effluents of chemical conditioning reagents and optionally, if necessary, antifoaming agents is preferred. Characteristically, the said process also comprises the injection of carbon dioxide ($CO_2$) into the aqueous effluents, in an amount which is sufficient to give them a pH of less than 7.8.

In a preferred embodiment, the aqueous effluents are paper manufacturing process waters, such as white waters including white waters from grids in a paper machine. Said waters contain suspended matter, including fibers (said suspended matter including fibers will be called from now on fibrous matter). The process of the present invention allows one to concentrate the fibrous matter and recuperate it in order to reincorporate said fibrous matter into the pulp.

Among other advantages, the process of the present invention allows one to advantageously and efficiently separate suspended matter from a liquid phase to obtain a liquid phase free from suspended matter. Said suspended matter can contain fibers, microfibers, pigments, dies, fillers, among other possible constituents. The separation is performed in one or several steps including steps of filtration, flotation, thickening or clarification. During said steps, chemical products can be added such as antifoaming agents, flocculating agents and coagulating agents. Specific equipment used during the separation steps include, for example, tanks, grids, twin wire press, and a disk press.

The present invention deals with an improvement in the separation of two phases, one is a liquid phase, and the second is a solid phase, and it is not a selective recuperation of one of the constituents of one of the phases. The injection of sufficient carbon dioxide to lower the pH to less than 7.8 constitutes the improvement within the meaning of the invention. The beneficial effect on removing materials in suspension and/or colloidal materials present in the treated effluent, and, more generally, on the separation of liquid and solid phases of the said effluent, has been demonstrated for the injection of carbon dioxide in such a manner.

BRIEF DESCRIPTION OF THE FIGURE OF THE DRAWINGS

FIG. 1 of the Drawing depicts schematically a process in accordance with the present invention, wherein an effluent is treated.

Figure 2:
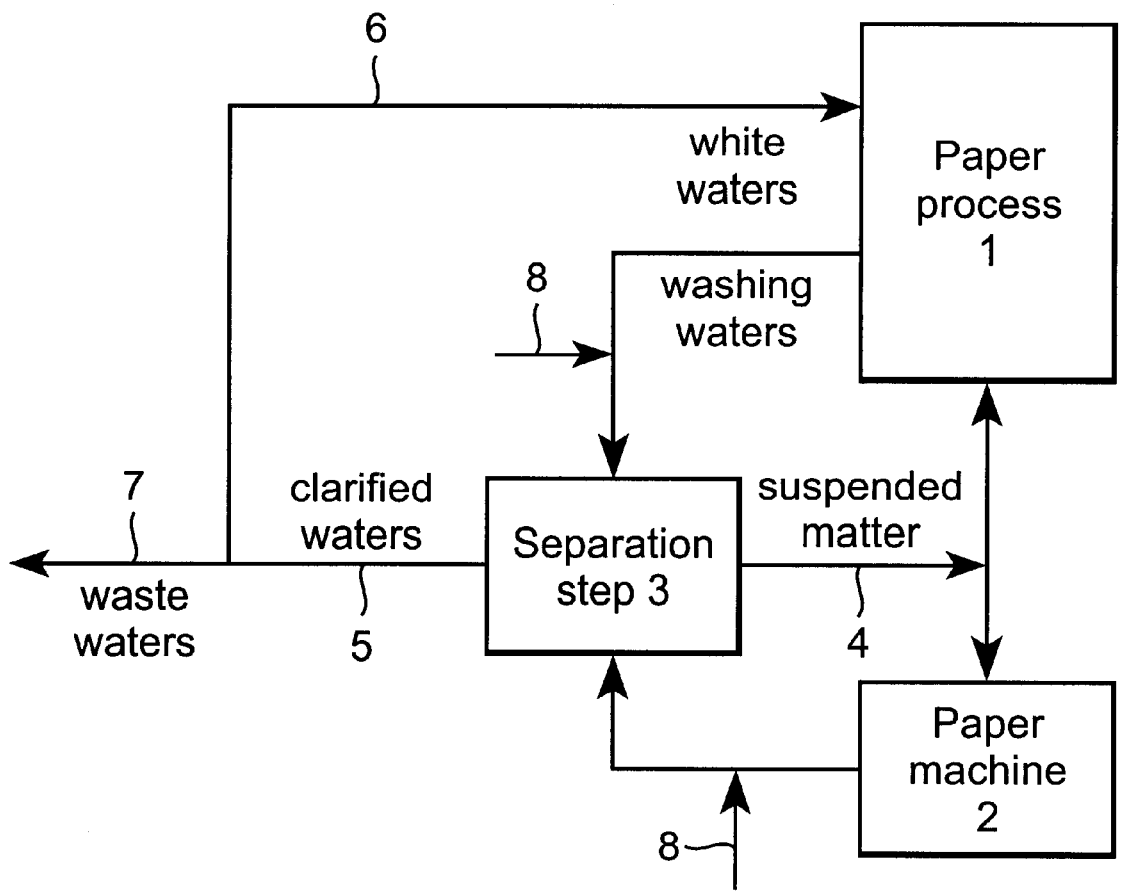

FIG. 2 of the Drawing is a flow sheet of a general paper process in accordance with the present invention.

DETAILED DESCRIPTION OF THE PREFERRED EMBODIMENTS

According to the invention, the said carbon dioxide is not generated in situ. Nor is it injected to carry out simple bubbling. It is injected under conditions in which it exerts a real chemical action, the said chemical action being reflected in particular by a lowering in the pH of the effluent. To exert such a chemical action, it is dissolved in the effluent and generates (bi)carbonates (bicarbonates and carbonates) therein.

It is believed that what at least partly accounts for the surprising results observed, during the implementation of the invention, is the presence of these (bi)carbonates. By enhancing the action of the chemical conditioning agents and the antifoaming agents, the said (bi)carbonates allow a substantial saving thereof. The said results are surprising since the same beneficial effects are not obtained when sulphates are added.

It is noted here, incidentally, that the injection of $CO_2$, which is recommended in the context of the present invention, not only gives the saving in chemical reagents, but also prevents the formation of struvite $[Mg(NH_4)(PO_4) \cdot 8H_2O]$, which is a product that gives rise to problems of encrustation of the networks. According to the prior art, $FeCl_3$ must be used to achieve this aim. The injection of $CO_2$, according to the invention, also has advantageous consequences on a dephosphatation step, which is liable to be involved.

Mention has been made of an injection of $CO_2$; this should generally be understood as at least one injection of $CO_2$.

Advantageously, the said injection of $CO_2$ is carried out before or at the same time as the addition of the chemical conditioning reagents and/or antifoaming agents. According to advantageous embodiments of the process of the invention, the addition of antifoaming agents is preceded by an injection of $CO_2$ and/or at least one addition of chemical conditioning reagents is preceded by an injection of $CO_2$.

It is proposed here to place the invention more specifically in its context. The said context is that of the treatment of effluents, an example which is schematically depicted in the Figure of the Drawings:
  dilute aqueous effluents, which it is desired simply to concentrate,
  dilute aqueous effluents, which are treated in order to obtain liquid sludges,
  liquid sludges which are treated in order to obtain thickened sludges,
  dilute aqueous effluents which are treated in order to obtain thickened sludges (this process passes via liquid sludges),
  charged aqueous effluents which are treated in order to rid them of at least some of their charge, in order, for example, to bind the said charges to a substrate.

Depending on the case under consideration, it may be considered that the introduction of $CO_2$ according to the invention facilitates the removal of the materials in suspension and/or colloidal materials (which thus optionally constitute charges) present in the effluent in order to recover them subsequently or in order to bind them to a substrate.

The treatment of the aqueous effluents can, in any given case, take place according to several variants which include a larger or smaller number of steps. It can come down to a treatment of waters, a treatment of sludges or take a variety of forms from A to Z for the production of thickened sludges from waters, etc. It comprises the addition to the effluents, before they have been subjected to steps directed towards separating a solid phase and a liquid phase (filtrate), of chemical conditioning reagents or chemical reagents for flocculation and/or coagulation, such as inorganic salts and/or synthetic organic polymers. These reagents are familiar to those skilled in the art and can consist in particular of aluminium salts, such as aluminium sulphate $[Al_2(SO_4)_3 \cdot 18H_2O]$ and aluminium chloride $(AlCl_3 \cdot 6H_2O)$; aluminium polymers, in particular poly(aluminium acrylates) (PAC); iron salts, such as ferric chloride $(FeCl_3 \cdot 6H_2O)$, ferric sulphate $[Fe_2(SO_4)_3 \cdot 9H_2O]$; anionic polyelectrolytes, such as acrylamide-acrylate copolymers of high molecular mass; nonionic polymers, such as polyacrylamides; cationic polyelectrolytes, and in particular those in which the cationic groups are quaternary ammoniums or amine salts, etc.

The said treatment also comprises, if necessary, the addition of antifoaming agents to dilute effluents.

Such dilute effluents can be pre-neutralized (so that their pH is between 8 and 8.5) and then, if necessary, treated with antifoaming agents, then treated with chemical conditioning reagents, before being decanted and filtered. This thus gives, on the one hand, a filtrate, and, on the other hand, either more concentrated effluents or liquid sludges. These sludges or other sludges, which are moreover obtained, can, after having optionally been subjected to a natural fermentation operation or to a bacterial digestion operation, be thickened, in one or more steps during which they are further treated using chemical conditioning reagents.

According to the invention, at least one injection of $CO_2$ is thus involved in this sequence of steps.

The said injection can take place prior to the process, in particular during the neutralization of the effluents if such a neutralization is carried out.

In point of fact, it is not excluded from the context of the invention for the $CO_2$ to be injected in an amount such that it achieves both the said neutralization (reduction of the pH to a value of about 8–8.5) and its role as a chemical agent within the meaning of the invention (which brings the said pH to a value of less than 7.8). However, it is generally preferred for the neutralization of the effluents, if this is necessary, to be carried out conventionally, in particular by introducing an acid, and for the carbon dioxide to be introduced after the said neutralization (after the said acid).

Thus, in the context of an advantageous variant of the process of the invention, the said injection of $CO_2$ is carried out, prior to the said process, before or during the addition of chemical conditioning reagents and the optional addition of antifoaming agents, after an optional neutralization step. The said $CO_2$ is thus injected into liquid effluents whose pH is generally between 8 and 8.5, in order to lower the said pH to a value of less than 7.8.

In the situation in which antifoaming agents are used, the said injection of $CO_2$ is advantageously carried out before adding the said antifoaming agents. This thus gives, as mentioned previously, a substantial saving in the amount of antifoaming agents required for the expected effect. In such a situation, it is not at all excluded to carry out at least one other injection of $CO_2$ after the process, before or during the addition of chemical conditioning reagents.

In the situation in which no antifoaming agents are used, at least one injection of $CO_2$ is also advantageously envisaged, before the addition of chemical conditioning reagents.

It is thus understood that the addition of antifoaming agents is advantageously preceded by an injection of $CO_2$ and that, in the absence of antifoaming agents, at least one addition of chemical reagents is advantageously preceded by an injection of $CO_2$. In point of fact, in the context of the process of the invention, at least one injection of $CO_2$ is advantageously envisaged before the introduction of antifoaming agents and/or the introduction of chemical conditioning reagents.

It is equally possible to envisage either a single injection of $CO_2$, advantageously prior to the introduction of any chemical reagent of the antifoaming agent or chemical conditioning reagent type, or a plurality of injections of $CO_2$.

The said $CO_2$ can be injected either into dilute liquid effluents or into concentrated liquid effluents or more or less thick sludges. It can be used, as already mentioned, either in the context of processes for purifying aqueous effluents, or in the more general context of industrial processes in which it is desired to separate a dispersed solid phase from a liquid phase containing it.

The said $CO_2$ can be injected in liquid or gas form. It is advantageously injected in gas form.

The said $CO_2$ can be injected into pipes or into tanks or reactors. It can be injected through porous walls. It is advantageously injected via (a) branch connection(s) (at least one branch connection).

It has been mentioned that the said $CO_2$ is injected in an amount which is sufficient to bring the pH of the effluent into which it is injected to a value of less than 7.8. Advantageously, it is injected in an amount which is sufficient to bring the said pH to a value of between 6.4 and 7.5, even more advantageously between 6.6 and 7.3. It is generally recommended to bring the value of the pH to about 6.8.

It is also pointed out here that:
  during the treatment of dilute suspensions (to obtain more concentrated suspensions and in particular liquid sludges, or more generally to obtain a solid phase separated from a liquid phase), it is most particularly recommended to inject the $CO_2$ before the introduction(s) of chemical flocculation and/or coagulation reagents such as inorganic salts and/or synthetic organic polymers (or even before the introduction of antifoaminq agents);
  during the treatment of liquid sludges (optionally obtained directly from the said dilute suspensions) in order to generate sludges with a higher solids content, it is strongly recommended to inject the $CO_2$ before the introduction(s) of chemical flocculation and/or coagulation reagents such as inorganic salts and/or synthetic organic polymers; this (these) introduction(s) being intended to thicken or (and) condition the said liquid sludges in order to increase their capacity for dehydration. During the treatment of the said sludges, two steps are generally envisaged: a first step referred to as a thickening step, and a second step known as a mechanical dehydration step. The $CO_2$ is thus introduced during at least one of these two steps.

As will not have gone unnoticed by a person skilled in the art, the process of the invention can be carried out, without any difficulty, in existing plants. Its economic advantage is evident to a user: the partial replacement of treatment reagents, of the processes of the prior art, with carbon dioxide ($CO_2$) allows a substantial reduction in the cost of the said processes, since the cost of the said carbon dioxide (added according to the invention) is about one-third of the cost of the reagents replaced.

The invention is now described with reference to FIG. 1 of the Drawing, which diagrammatically illustrates one embodiment of the process of the invention. It is, in fact, a "flowsheet" of a process for treating aqueous effluents (such as waste waters) which incorporates the improvement of the invention.

The dilute aqueous effluents are first neutralized. Next, in a so-called coagulation tank, they are mixed with antifoaming agents (A) and polymers (P), which are chemical conditioning reagents. Polymers (P) are also used in the so-called coagulation tank. The effluents thus conditioned are subsequently decanted and then filtered. Polymers (P) can be used during the filtration. After the said filtration, a filtrate is obtained, on the one hand, and liquid sludges are obtained, on the other hand. The sludges are then subjected to the action of bacteria in a digester. On leaving the digester, they are thickened by passage in an endless screw. On entering the said endless screw, chemical conditioning polymers (P) are added. The sludges thus thickened are further conditioned using polymers (P), before being subjected to a final step of mechanical dehydration. Thickened sludges are thus obtained.

It may be considered that the said process involves two steps:
  a step, I, of treatment of dilute effluents,
  a step, II, of treatment of liquid sludges.

It is pointed out here that the polymers (P) which are used throughout the said process are not necessarily of the same nature.

Characteristically, according to the invention, downstream of the neutralization step and upstream of the introduction of the antifoaming agents and the first introduction of the polymers (P), $CO_2$ is injected into the treated effluent. Downstream of the said injection, the pH of the effluent is less than 7.8.

Referring now to FIG. 2 of the Drawing, there is schematically depicted a general paper process to which the claimed invention can be applied as follows.

Waters (generally white waters or washing waters) from paper process 1 and/or white water from paper machine 2 are treated in a separation step 3.

Only one separation step is represented in FIG. 2, but one must consider that at different locations along the paper process, aqueous effluents are recuperated and treated according to the following separation process.

According to it location, the separation step can include one or more of the following steps: thickening, filtration, flotation and/or clarification or other physical separation. During this step, suspended matters are separated from liquid phase by:
  mechanical action (disk press, twin press, band press, etc.);
  natural and/or chemical action (in flotation cell);
  with polymers addition;
  or a combination of the preceding actions.

From the separation stage, concentrated suspended matter containing fibers are recovered 4 and are reincorporated to the process 1 or to paper machine 2 and clarified waters 5 are recovered to be totally or partially reincorporated to the process 1 via 6 and/or totally or partially directed to waste water treatment via 7.

According to the improvement of the invention, $CO_2$ is added to the water from process 1 and/or to the white waters from the paper machine 2 prior to the separation step 3, e.g., at 8. Advantages in the amount of reagents used is realized. An example of a separation stage consisting of a flotation stage with addition of chemical agents, the same separation being performed with and without $CO_2$:

|  | With $CO_2$ | Without $CO_2$ |
| --- | --- | --- |
| Antifoaming | 0.24 l/h | 0.30 l/h |
| Flocculating Agent | 920 l/mn | 1200 l/mn |
| Coagulating Agent | 250 l/mn | 1300 l/mn |
| $CO_2$ | 5.5 kg/h | 0 kg/h |

The process of the invention is finally illustrated by the specific example below.

The Applicant has used the improvement currently claimed in the context of the treatment of aqueous effluents in a paper industry. The Applicant quantitatively evaluated the advantages of the said improvement as regards the first steps of the process.

The treated effluents—dilute aqueous suspensions, mainly charged with wood fibres, in a proportion of about 10 g/l—are brought from the factory in a first tank in which they undergo an antifoaming treatment. They are then transferred into a second tank, for coagulation. Their preconditioning is then completed by adding flocculants thereto, in-line. Thus preconditioned, they are subsequently decanted and then filtered to generate liquid sludges. The said sludges are subjected, downstream, to a digestion operation and then conditioned before undergoing a mechanical dehydration operation.

The injection of $CO_2$ is carried out on a pipe for conveying the effluents from the factory to the antifoaming-treatment tank. The effluent travels in the said pipe, with a diameter of 200 mm, at a pressure of 2.5 bar and at a flow rate of 400 m³/h and its pH is between 7.2 and 7.8. The branch connection into the said pipe, for the injection of $CO_2$ is located 25 m upstream of the tank. The $CO_2$ is injected in gas form at a pressure of 4 bar. The amount of $CO_2$ injected is 30 kg/h.

The said injection of $CO_2$ is in fact controlled by measuring the pH of the effluent leaving the antifoaming-treatment tank; this pH is stabilized around the value 6.9.

Under these conditions, it was possible, by virtue of the introduction of $CO_2$, to reduce the amount of antifoaming agents required by about 30% (by weight).

Similarly:
- the amount of coagulants (poly(aluminium acrylates)) which are introduced on entering the coagulation tank, downstream of the antifoaming treatment tank, were able to be reduced from 100 l/h to 50 l/h;
- the amount of flocculants (cationic synthetic organic polymers) which are introduced, in-line, downstream of the coagulation tank, were also able to be reduced by about 30% (by weight).

After injecting the flocculants, the pH of the effluent is stabilized at 7.

A person skilled in the art will have grasped the importance of the savings which can be made by means of implementing the improvement of the invention.

It is noted that an increase in the yield of the screw presses ("tassters") was moreover found, downstream, at the level of the sludge die.

What is claimed is:

1. A process for treating more or less concentrated aqueous effluents, said process comprising at least one step of physical separation of a liquid and of a solid phase dispersed in said liquid phase and at least one addition of chemical conditioning reagents and optionally of antifoaming agents, wherein it also comprises the injection of carbon dioxide ($CO_2$) into said treated aqueous effluents, in an amount which is sufficient to give them a pH of less than 7.8, and wherein, before the injection of said $CO_2$, the effluents are pre-neutralized.

2. The process according to claim 1, wherein said injection of $CO_2$ is carried out before or at the same time as the addition of said reagents and/or antifoaming agents.

3. The process according to claim 2, wherein the addition of antifoaming agents is preceded by an injection of $CO_2$.

4. The process according to claim 2, wherein at least one addition of chemical conditioning reagents is preceded by an injection of $CO_2$.

5. The process according to claim 2, wherein said $CO_2$ is injected in liquid or gas form.

6. The process according to claim 2, wherein said $CO_2$ is injected via at least one branch connection.

7. The process according to claim 1, wherein the addition of antifoaming agents is preceded by an injection of $CO_2$.

8. The process according to claim 7, wherein at least one addition of chemical conditioning reagents is preceded by an injection of $CO_2$.

9. The process according to claim 7, wherein said $CO_2$ is injected in liquid or gas form.

10. The process according to claim 7, wherein said $CO_2$ is injected via at least one branch connection.

11. The process according to claim 1, wherein at least one addition of chemical conditioning reagents is preceded by an injection of $CO_2$.

12. The process according to claim 11, wherein said $CO_2$ is injected in liquid or gas form.

13. The process according to claim 11, wherein said $CO_2$ is injected via at least one branch connection.

14. The process according to claim 1, wherein said $CO_2$ is injected in liquid or gas form.

15. The process according to claim 14, wherein said $CO_2$ is injected via at least one branch connection.

16. The process according to claim 1, wherein said $CO_2$ is injected via at least one branch connection.

17. The process according to claim 1, wherein said $CO_2$ is injected in an amount such that it lowers the pH of the treated effluent to a value of between 6.4 and 7.5.

18. The process according to claim 17, wherein said $CO_2$ is injected in an amount such that it lowers the pH of the treated effluent to a value of between 6.6 and 7.3.

19. The process according to claim 1, wherein, during the treatment of dilute suspensions, said $CO_2$ is injected before the introduction(s) of chemical flocculation and/or coagulation reagents.

20. The process according to claim 19, wherein said chemical flocculation and/or coagulation reagents are inorganic salts and/or synthetic organic polymers.

21. The process according to claim 1, wherein the aqueous effluent treated comprises paper manufacturing process waters.

22. The process according to claim 20, wherein, during the treatment of liquid sludges in order to generate sludges with a higher solids content, said $CO_2$ is injected before the introduction(s) of chemical flocculation and/or coagulation reagents; said introduction(s) being to thicken and/or condition said liquid sludges in order to increase their capacity for dehydration.

23. The process according to claim 22, wherein said chemical flocculation and/or coagulation reagents are inorganic salts and/or synthetic organic polymers.

24. The process according to claim 1 wherein said aqueous effluents are processing waters, industrial or urban waste waters, sludges or sludges derived from these waste waters.

* * * * *